Nov. 17, 1970    B. L. SHERROD    3,540,226
METHOD OF TOWING A VESSEL ON A BODY OF WATER
Original Filed April 15, 1966    5 Sheets-Sheet 4
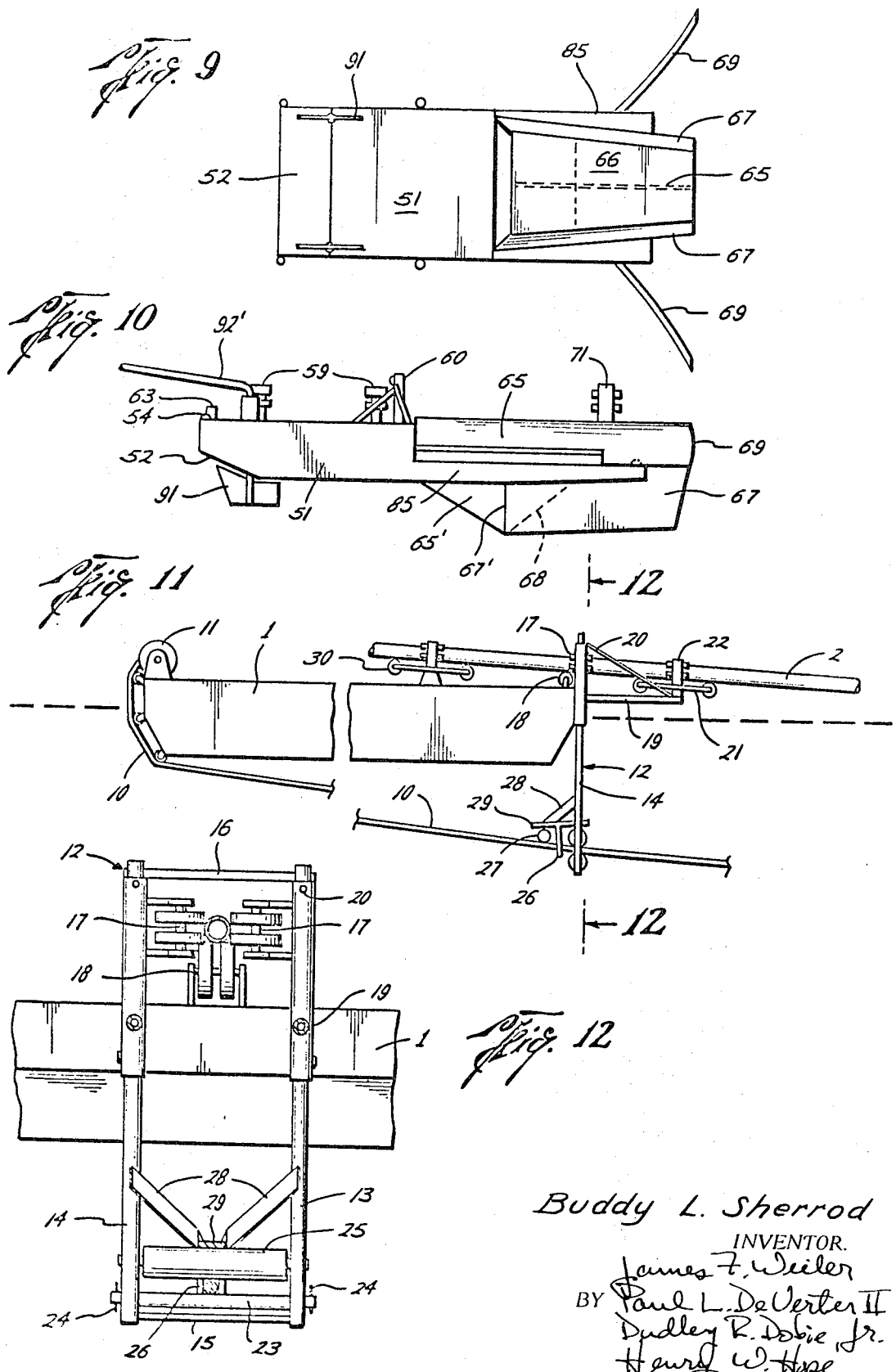
Buddy L. Sherrod
INVENTOR.

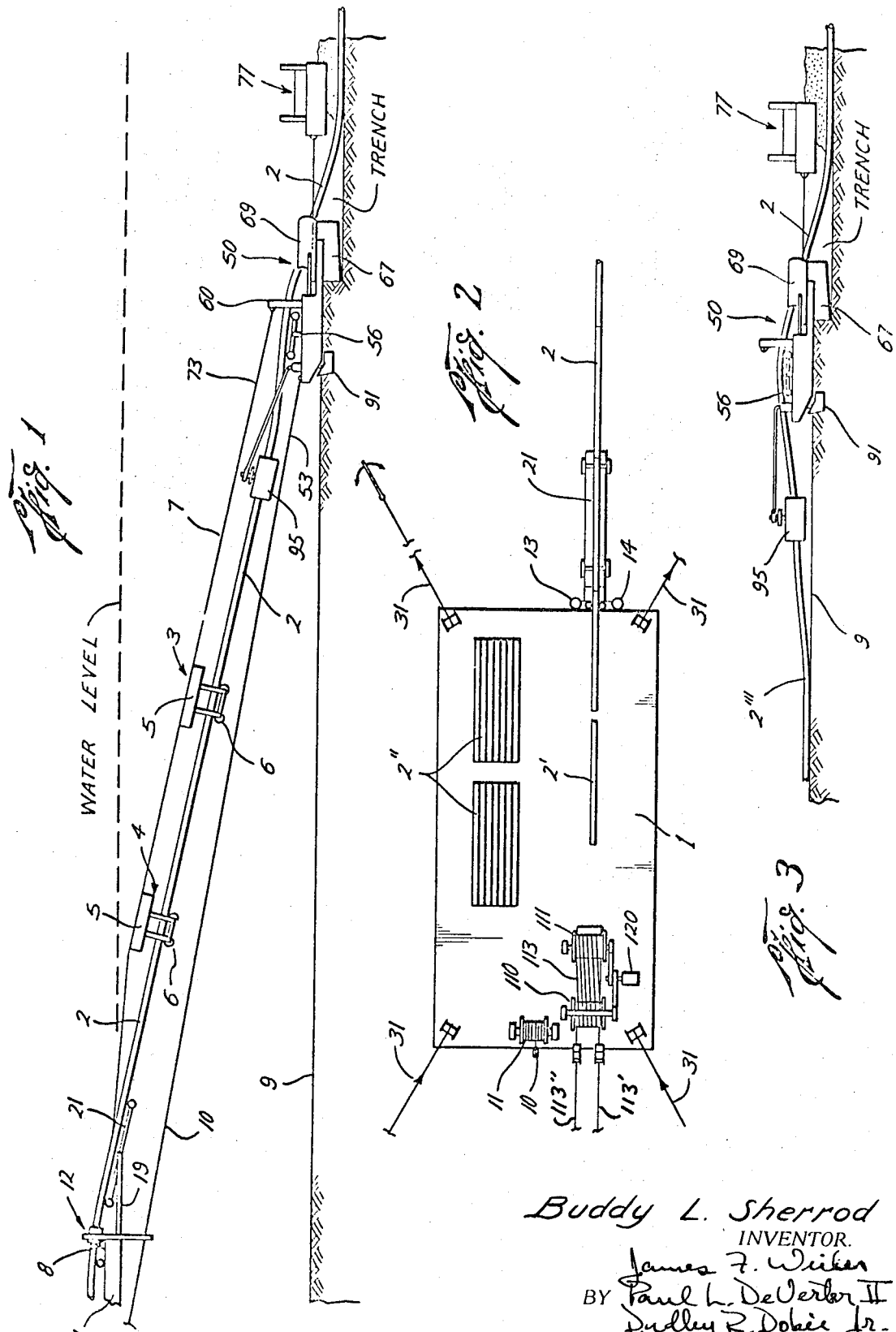

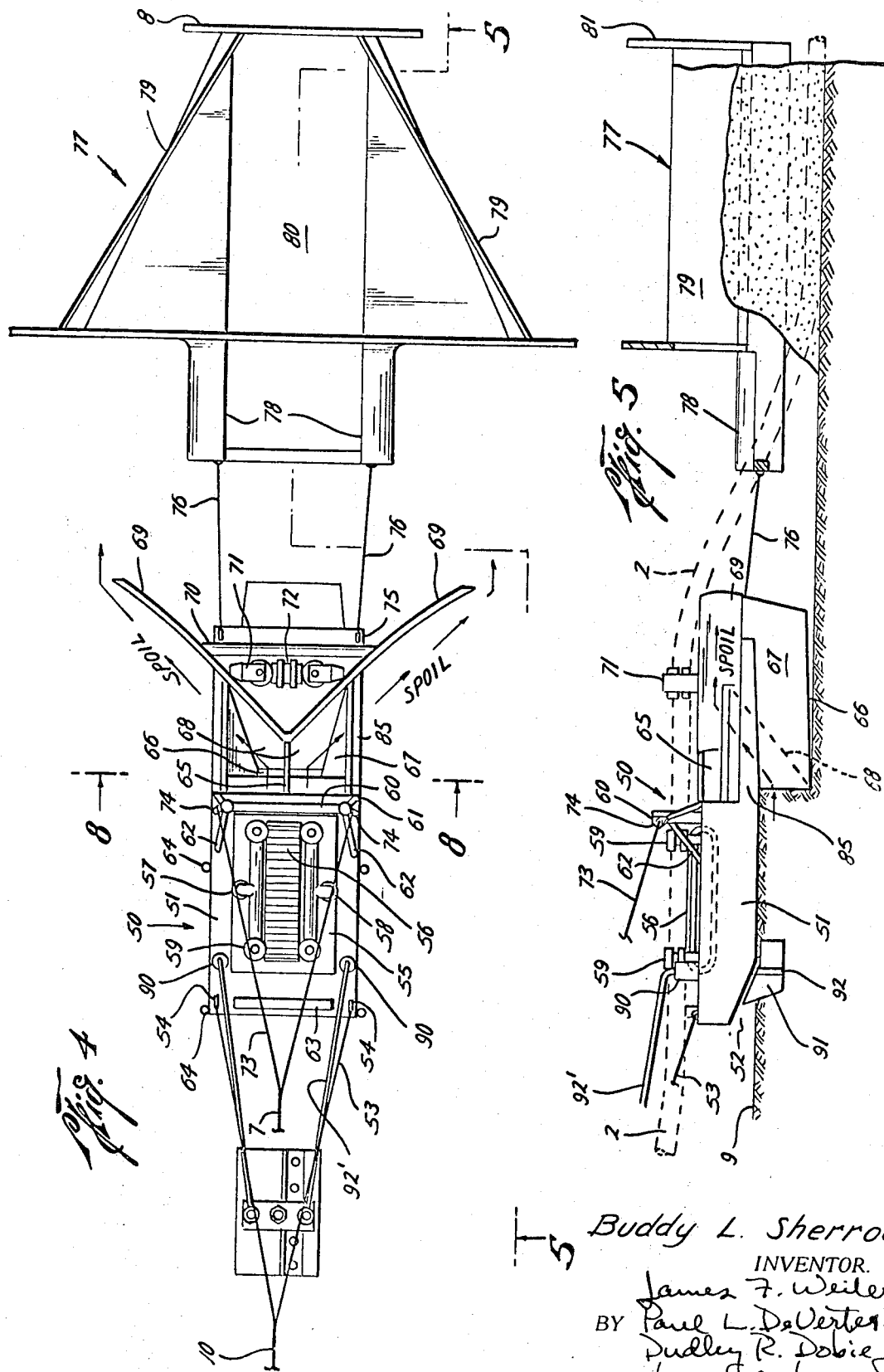

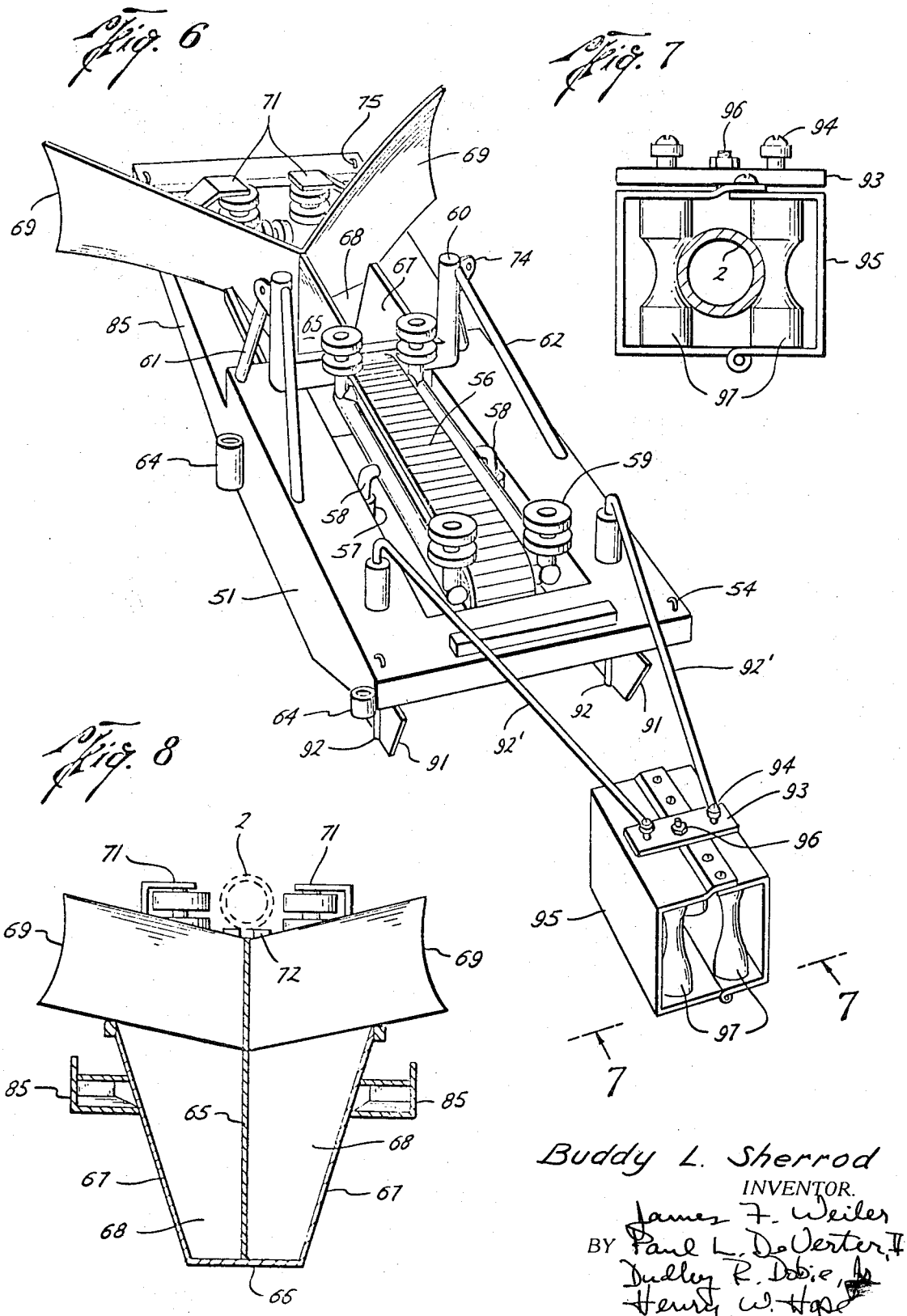

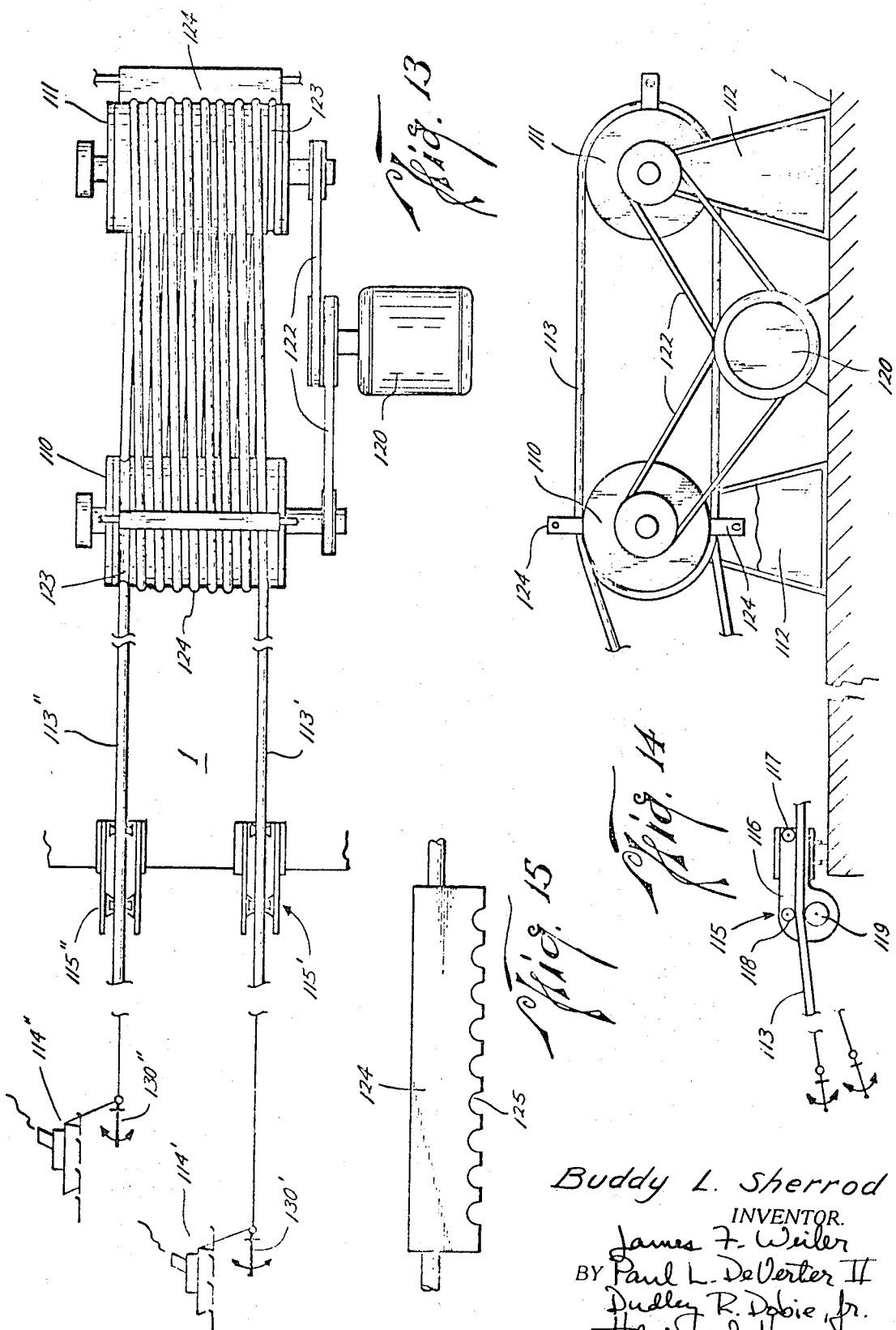

United States Patent Office 3,540,226
Patented Nov. 17, 1970

3,540,226
METHOD OF TOWING A VESSEL ON A BODY OF WATER
Buddy L. Sherrod, P.O. Box 1075, Conroe, Tex. 77301
Application Apr. 15, 1966, Ser. No. 542,832, now Patent No. 3,347,054, dated Oct. 17, 1967, which is a continuation-in-part of application Ser. No. 83,290, Jan. 17, 1961. Divided and this application Sept. 25, 1967, Ser. No. 670,370
Int. Cl. B63b 35/04; E02f 5/02; F16l 1/00
U.S. Cl. 76—107    2 Claims

ABSTRACT OF THE DISCLOSURE

The present invention relates to a method and means for pulling a barge or like vessel on a body of water. The present invention utilizes pulling vessels at opposite ends of a cable which is passed about a sleeve drum, which vessels move and act as an anchor in alternating fashion, whereby the movement of the barge is continuous.

CROSS REFERENCES TO RELATED APPLICATIONS

The present invention is a divisional application of my co-pending application Ser. No. 542,832, filed Apr. 15, 1966 and entitled Underwater Pipe Trenching Device, now, Pat. No. 3,347,054, issued Oct. 17, 1967; which was in turn a continuation-in-part of my earlier filed application Ser. No. 83,290, filed Jan. 17, 1961, now abandoned.

It is quite often necessary to lay pipe on the beds of bodies of water, and the problems that are encountered in doing this are well known. The most vexing of these problems are the possibility of fouling or snagging on anchors of passing boats and the possibility of damage due to the action of the water itself on the unprotected pipe. Accordingly, it is often desirable to bury the pipe in the bed or floor of the body of water. Various means have been devised to accomplish this, among which are such things as bucket and suction dredges and high-pressure jet systems. Underwater plows have also been used to a limited extent, but, prior to the present invention, have proven quite inadequate except in very shallow water. These methods all suffer from various defects of one sort or another, the most common of which are: lack of speed in performing the operation, high cost, both in production and operation, inadequate means to keep the pipe aligned properly, and unreliable performance in trenching. Another disadvantage is that of tow cable breakage due to the resistive forces created while digging the trench.

Before the discovery of the present system and arrangement, the method of pulling whatever type of trenching apparatus that was being used, was a slow and tedious intermittent process, requiring frequent stops and lengthy periods of time to set up each pull. Little control was maintained over the trenching mechanism except for that inherent in pulling it forward. Furthermore, various factors will cause the direction of feed of the pipe to vary and, since the pipe must necessarily be connected to the trenching mechanism itself to be certain that it is fed into the trench being dug, any such change in direction of feed often disrupts the digging of the trench.

The present invention overcomes these disadvantages of the prior art devices by the utlization of a uniquely designed plow which is capable of cutting a trench of varying sizes in water of substantial depth. The plow utilizes two adjacent, essentially U-shaped digging members having means to move the dirt, silt, etc., dug from the trench (hereinafter referred to as spoil) up and away from the trench until the pipe is laid. This novel design also provides a means by which the pressure exerted by the soil when the trench is dug is greatly decreased. It further incorporates improved means for laying the pipe into the trench as it is dug.

The present invention is further characterized by the utilization of novel guiding means to insure the proper alignment of the pipe with the trench. Guide means, through which the pipe is fed, are attached to the front of the plow. One or more rudders are movably fastened to the bottom of the plow and are operatively connected to the guide means. Due to water currents, movement of the barge used to lay the pipe (hereinafter referred to as the lay barge) or other such factors, the pipe string may move as it descends to the floor of the body of water thereby changing the direction which the pipe is fed. This change of direction is transmitted from the guide means to the rudders, thus changing the path along which the trench is being dug.

The present invention further employs a novel method of pulling the underwater trenching apparatus which drastically reduces the time consumed in performing the trenching operation. Two pulling vessels (hereinafter called tugs) are utilized, each being attached to a separate end of a single pulling cable. The portion of the cable intermediate of its ends is passed about a rotating sleeve-drum on the lay barge a sufficient number of times to provide a frictional contact sufficient to move the barge by rotation of the sleeve-drum. As the sleeve-drum is rotated, one end of the cable is taken up and one end let out. The tug attached to the end being taken up is held stationary (such as by the use of anchors) and the lay barge is pulled to it. Simultaneously, the second tug moves forward as its cable is played out. When the barge reaches the first tug, the sleeve-drum is turned in the opposite direction, and the operation is repeated with the second (and now distant) tug being held stationary. This method of pulling the lay barge and its connected trenching apparatus is an almost continuous one and results in a tremendous decrease in time of operation.

It is, therefore, an object of the present invention to provide an economical, efficient and reliable method and apparatus for underwater trenching and pipe laying.

It is a further object of the present invention to provide novel trenching apparatus which will function reliably and efficiently in substantial depths of water. A still further object is to provide a novel trenching apparatus capable of digging a trench which can be of varying dimentions up to several feet in depth and width. A still further object of the present invention is to provide a unique plow which is designed so as to relieve a substantial portion of the pressure and friction exerted by the soil as the plow is pulled to cut the trench, thus relieving much of the stress on the towing cable and associated apparatus.

An additional object of the present invention is to provide a dependable method and apparatus to properly place the pipe in the trench. A further object is to provide guide means to change the direction of movement of the plow as the direction from which the pipe is fed changes, and to be responsive to any sudden and unexpected shifts in the direction of pipe feed.

An additional object is to provide a means and method for pulling the trenching apparatus which is simple to perform, economical to operate, and which provides a substantial increase in speed of operation. A further object is to provide a method and apparatus of pulling the trenching equipment which is substantially a continuous operation and requires relatively little set-up time.

Another object of the present invention is to provide pipe trenching apparatus which may be used to bury pipe as the pipe is being laid or which may be used to bury pipe that has been previously strung across the bottom of the body of water.

These and other objects, advantages, and features of novelty of the invention will become apparent upon reading the following specification with reference to the accompanying drawings in which the same reference characters refer to the same parts throughout the several views, and in which:

FIG. 1 is an elevational view of the present invention showing the pipeline being laid in the trench as the trench is dug, the lay barge being partially shown, FIG. 2 is a plan view of the lay barge, FIG. 3 is an elevational view of the trenching mechanism of the present invention being utilized with a pipe that has previously been strung across the ocean floor, FIG. 4 is a plan view of the trenching mechanism of the present invention and a back filler which may be used, FIG. 5 is a side view of the apparatus of FIG. 4 partially in section taken along line 5—5 of FIG. 4, the pipe being laid being shown in broken lines, FIG. 6 is a perspective view of the trenching mechanism with its guide means, FIG. 7 is an end view of the housing or collar of the guide means taken along line 7—7 of FIG. 6, FIG. 8 is a sectional view of the trenching mechanism taken along line 8—8 of FIG. 4, FIG. 9 is a bottom view of the trenching mechanism taken along line 8—8 of FIG. 4, FIG. 10 is an elevational view of a modified embodiment of the trenching mechanism, FIG. 11 is an elevational view of the lay barge showing the means of feeding the pipe and towing cable, FIG. 12 is a sectional view of the pipe and cable guiding means taken along line 12—12 of FIG. 11, FIG. 13 is a plan view of the apparatus used to pull the lay barge and trenching equipment, FIG. 14 is an elevational view of the apparatus shown in FIG. 13, and FIG. 15 is an elevational view of the hold-down or locking bar employed in the apparatus of FIG. 13.

Turning now to the drawings, in FIG. 1 there is shown the present invention as it is used to lay pipe beneath the surface of the bottom of a body of water. The lay barge is shown at the left hand side of FIG. 1 and is indicated generally by the reference numeral 1. The pipe which is to be laid 2 is shown being fed from the barge and descending to the bottom of the body of water. For simplicity, the body of water will hereafter be referred to as a "lake" although it is understood that the present invention may be used to lay pipe in any other type of body of water. As the pipe 2 descends, a float or ballast train, indicated generally by the numeral 3, is utilized to prevent the pipe from suddenly dropping off or from descending at too great a rate. The ballast train 3 also provides a uniform rate of descent for the pipe, thereby preventing possible damage to the pipeline which may result from irregular and uneven movement of the pipe from the lay barge 1 to the trench. The ballast train 3 is made up of independent float members 4, which are in turn, composed of float tanks 5 to provide the necessary ballast, and guide means 6 to support the pipe. The cable 7 is connected to the lay barge at one end and to the trenching mechanism at its other end and is attached to the individual float members 4 at various points, intermediate of its ends. The line 7 prevents the float means from rising to the surface and maintains them in the proper angle of descent. The line 7 is attached to the trenching mechanism 50 by the yoke 73 and the lugs 74. Reel or cable drum means 8 are located on the barge to maintain the proper tautness in the cable 7, thus compensating for any change in distance between the lay barge and the trenching mechanism. The structure of this specific float arrangement is described in more detail in my co-pending application Ser. No. 83,290, filed Jan. 17, 1961.

The trenching mechanism 50 and the back filler 77 is pulled along the bottom 9 of the lake by means of a towing cable 10. Referring now to FIG. 2, the towing cable 10 is fed from a reel or cable drum 11 located in the front or left-hand end of the barge 1 as seen in FIG. 2. The towing cable then passes rearwardly beneath the barge through appropriate pulleys and guides to connect with the trenching apparatus 50 as will be described below.

Turning now to FIGS. 11 and 12, an optional means by which the pipe 2 and towing cable 10 may be fed from the lay barge 1 is shown in greater detail. Located at the rear of the barge is a rectangular frame member 12. This rectangular frame member is composed of two vertical members 13 and 14 the ends of which are connected by two horizontal members 15 and 16. This frame may be fastened together by any well-known means such as welding or bolting that provides sufficient rigidity for the purposes herein set forth. On the upper portion of the rectangular frame 12 are located two side guide roller units 17. The rollers in the units 17 rotate about a vertical axis and act against the sides of the pipe 2 as is best shown in FIG. 12. One side guide roller unit 17 is mounted on each of the vertical members 13 and 14 and cooperate to prevent any lateral motion of the pipe while it is being fed into the water. Located on and at the rear of the barge 1 is bottom guide roller unit 18. The rollers in unit 18 rotate about a horizontal axis and act against the bottom of the pipe 2 to provide support for the pipe. Extending rearwardly from the vertical members 13 and 14 are the support members 19. Members 19 lie in a horizontal plane and are reinforced by the diagonal members 20. A conventional Athey track 21 is supported at the free or outer ends of the horizontal members 19. The Athey track provides additional support for the pipe as it leaves the barge 1 and positions it for the proper angle of descent. The Athey track is rotatable about the horizontal axis 21 so that the angle of descent may be varied. Also located on the Athey track are side guide roller units 22 (only one of which is shown in FIG. 11).

Turning now to the towing cable, as can be seen in FIG. 11, the cable is fed from the reel 11 which is located at the front of the barge. The cable is then passed rearwardly beneath the barge to the lowermost portion of the rectangular frame 12. A rod 23 is rotatably mounted at the lower ends of the vertical members 13 and 14 and is prevented from sliding out of the vertical members by the cotter pins 24. Also rotatably mounted on the lower portion of the vertical members 13 and 14 is the cylindrical member 25. The towing cable 10 passes between these rotatable members 23 and 25 as well as the yoke 26 and the guide roller 27. The yoke 26 and guide roller 27 are supported by the members 28 which are attached to the vertical members 13 and 14 as is best seen in FIG. 12. A crossplate 29 acts in sliding contact with the roller 25 to properly position the yoke 26 and roller 27. By the cooperation of the rollers 23, 25 and 27 and the yoke 26 the towing cable 10 is maintained in proper position for towing the trenching mechanism 50 at all times.

Referring now to FIG. 2, there is shown a plan view of the lay barge including the apparatus used in pulling the barge which is located at the front or left-hand side of the barge as seen in FIG. 2. At the rear of the barge the apparatus described above for feeding the pipe into the water is shown. As the pipe 2 is fed into the water, additional lengths of pipe 2' must, of course, be added to the pipe. Welding stations may be located on the barge for attaching one or more lengths of pipe 2' simultaneously. Additional lengths of pipe are stored as indicated by the numeral 2" for future use. As shown in FIG. 11, additional Athey tracks 30 are utilized on the deck of the barge as is necessary, depending on the length of the pipe on the barge and the number of welding stations adding additional lengths of pipe to the pipestring 2.

Guide anchors 31 are shown at each corner of the barge 1. Reels are located on the barge deck from which cables extend to the anchors. As the barge 1 is moved forward, the cable is taken in from the anchors located at the front of the barge as shown by the arrows, and the cable is let out from the reels at the rear of the barge, also shown by the arrows. By keeping the cables to the guide anchors taut, the barge may be maintained in its desired path of travel. Various combinations of letting out and taking in of the cable to the guide anchors, will give the barge a certain amount of maneuverability. Under the present system of pulling the barge, to be discussed below, guide anchors are not normally necessary. However, they may be used in especially choppy water or rough weather. Additional guide anchors may also be located on the midportions of the barge 1.

The pipe 2''' in FIG. 3 has been previously strung across the bottom of the bay. This figure depicts the utilization of the present invention to bury such a pipe. The Athey track 56 located on the trenching mechanism 50, and which will be discussed more fully below, is shown in a lowered and horizontal position as compared with its position in FIG. 1.

Turning now to FIGS. 4 and 5, the actual trenching mechanism 50 and its associated backfiller 77 is shown in greater detail. The trenching mechanism itself, hereinafter referred to as a plow, includes as the front portion a sled 51. The sled 51 has an inclined bow 52 which aids in reducing the friction produced by pulling the sled across the floor of the bay and aids the plow in moving over a rough surface. The towing cable 10 is attached by means of the yoke 53 to lug members 54 also located at the bow or front portion of the sled 51. Located in the sled is a recessed bay area 55 in which is located an Athey track 56. The Athey track 56 is mounted in socket members 57 by means of the right angle support members 58. This mounting arrangement can better be seen in FIG. 6. On both sides of and at both ends of the Athey track 56 are located side guide rollers 59. These guide rollers 59 act against the sides of the pipe 2, shown in FIG. 5 in broken lines, to prevent any lateral movement of the pipe and to aid in aligning the pipe with the trench. Other conventional guide and support means may be substituted for the Athey track 56.

Also located near the front of the sled 51 are socket members 90. The guide means including the control rods 92, shown in FIG. 6 and discussed below with regard to FIG. 6, extend from said sockets 90 and slidably engages the pipe 2. The rudders 91 which control the direction of movement of the plow can be seen in FIG. 5. Located above the rear of the sled 51 is a U-shaped support member generally indicated by the numeral 60. This support member is braced by the members 61 and 62 and provides support for the yoke 73 and cable 7 supra and helps locate the pipe 2 as it passes over the plow. An additional pipe support 63 is located at the front of the sled.

The sled 51 is a hollow member and can be filled with air through suitable valve means (not shown) to raise the plow to the surface or otherwise to provide buoyancy. When it is desired to place the plow 50 on the bottom of the bay, the sled is appropriately weighted. Lugs 64 are located on either side of the sled and are used to attach additional pontoons or ballast tanks as is necessary. Similarly, additional ballast may be located at the rear of the plow.

The rear portion of the plow is the actual trenching portion, a front sectional view of which is shown in FIG. 8, to which reference is now made. The plow is connected to the sled 51 by members 85 and is composed of a center blade 65 which divides the plow into two equal segments. Each segment has a common base member 66 and an outer side wall 67. The leading edges of the bottom 66, the side wall 67 and the divider or center blade 65 are the actual cutting edges which cut the trench. All of the outer cutting edges are provided with clearance as further described hereinafter. The plow portions are further comprised of a sloping back wall 68 which slopes rearwardly from the bottom of the plow to the top. Thus two substantially equal compartments or plowing portions being essentially U-shaped in cross-section are formed by the members 65, 66, 67 and 68. Due to the forward motion of the trenching members 65, 66 and 67, the spoil which is dug from the trench moves up the back wall 68 to the top of the side wall 67 which is at least as high as the trench is deep. Extending outwardly from the divider 65 are two wings or spreaders 69. The wings 69 form a V with the apex being the forwardmost portion and being integral with the divider 65. The spreaders are curved as is best seen in FIG. 6 and provide a means by which the spoil which has been pushed to the top of the plow is displaced away from the trench to prevent it from spilling back into the trench.

Located behind the wings 69 and providing additional strength for the wings is a brace rod 70. Also located behind and between the wings 69 are additional side guide rollers 71 and bottom guide rollers 72. These guide rollers provide additional support and guidance for the pipe 2 and insures that the pipe leaves the plow in proper position to be received into the trench.

Under certain circumstances, after the pipe 2 is laid in the trench, it may be desired to backfill the trench. A backfiller 77 which may advantageously be used for this purpose will now be described. Cables 76 are attached to lugs 75 located at the rear of the plow and to the backfiller 77. The backfiller 77 provides means by which the spoil that has been dug from the trench and spread by means of wings 69, is returned to the trench, thereby covering the pipe which has been lain. The backfiller 77 has two lead portions 78 which move in the trench that has been dug, thus providing guidance for the backfiller. It is further comprised of wing members 79 which are of greater width than the spreaders 69 on the plow. As can be seen in FIG. 4, the members 79 converge toward the rear of the backfiller 77 and the spoil is channeled by the members 79 inwardly to pass through the open portion 80 back into the trench, thus covering the pipe. The back member 81 prevents the spoil from leaving the backfiller by means other than through the opening 80.

Referring now to FIG. 6, there is shown the control apparatus used to guide the plow 50 in the path from which the pipe is fed, and to react to any changes in direction of the pipe feed, adjusting the direction of travel of the plow, accordingly. The actual controlling structures are the rudders 91 shown beneath the sled 51. Control rods 92 attached to the rudders 91 extend up through the sled 51 and the sockets 90 located on the top of the sled. The rods 92 are then bent at an angle between 0° and 180° and are connected to the plate 93 by means of the nuts and bolts or other suitable attaching means 94. The portion of the control rods extending outwardly from the sockets 90 and connected to the plate 93 are indicated by the numeral 92'. The plate 93 is rotatably mounted on the control housing 95 by the pivot member 96. The control housing 95 may contain two rows of parallel rotatable members 97. As shown in FIG. 7, an end view of the control housing taken along line 7—7 of FIG. 6, the rotatable members 97 have reduced midsections which generally conform to the outside diameter of the pipe 2. The members 97 are spaced within the housing so as to be in rotatable contact with a portion of the pipe 2 at all times. As will be described hereinafter, displacement of the housing 95 results in corresponding adjustment of the rudders 91 to guide the trencher.

The present invention also employs a novel method of pulling the lay barge and trenching apparatus which has not been heretofore utilized in underwater pipe trenching. The apparatus employed in this method is shown in FIGS. 13 through 15. Two sleeve-drums 110 and 111 are mounted on support members 112 so as to rotate on horizontal axes in a clockwise or counterclock direction. The towing cable 113 is passed about the sleeve-drums 110 and 111 a sufficient number of times to provide sufficient frictional contact for the purposes to be herein set forth. A first end of the cable 113' is taken from the front sleeve-drum 110 and is passed through the guide means generally indicated by 115'. Referring now to FIG. 14, a typical guide means is shown and is generally indicated by 115. The guide means comprises sideplates 116 and roller members 117, 118, and 119. As can best be seen in FIG. 13, the roller members are tapered toward their midportions thus conforming to the circular cross section of the towing cables 113.

Referring back to FIG. 13, the cable end 113' is passed through the guide means 115' and is attached to an anchor 130' and a tug 114'. In a similar manner, cable end 113" is passed through guide means 115" and is attached to a tub 114" and anchor 130". As shown on the drawing, the cable end 113' is substantially longer than the corresponding end 113". A reversible motor 120 is connected by an appropriate drive train 122 to the sleeve-drums 110 and 111, and by this arrangement, the sleeve-drums 110 and 111 may be rotated either clockwise or counter clockwise as may be desired. The outer surface of the sleeve-drums 110 and 111 may include grooves 123 to receive the cable 113 as it is passed about the sleeve-drums. To prevent the cable from leaving the grooves, guide members 124 may be employed. An elevation view of a guide member 124 is shown in FIG. 15. Grooves 125 corresponding to the grooves 123 on the sleeve-drums 110 and 111 are located on the members 124. The guide memberes 124 are held securely by means of suitable conventional support members (not shown), and they may also be used as brakes for the drums.

Referring now to FIG. 9, a bottom view of the preferred embodiment of the present invention is disclosed. One of the primary advantages found in the present invention is demonstrated by this view. As can be seen, the outer surface of the actual plowing portion is composed of the bottom member 66 and the side members 67. The side members 67 are relatively far apart at their front ends as compared to the distance apart at their rearmost portions. In other words, the width of the portion which actually digs the trench, tapers in width from the front to the back. Referring to FIG. 5, it can be seen that the bottom 66 of the plow is inclined upwardly from the front to the rear. In this manner, clearance behind the cutting edges is provided. This is also true of the modified embodiment shown in FIG. 10. The advantages resulting from the structural features just mentioned will be discussed below with regard to the operation of the device.

Referring now to the modified embodiment of FIG. 10, it will be noted that the leading edge of the plow portion, indicated at 67', is set back from the sled 51 a substantially greater distance than in the case of the principal embodiment. The divider 65 is shown to extend from the leading edge 67' of the plow to the rear of the sled 51. This portion of the divider 65 is indicated at 65'. The depth of the cut is controlled to a certain extent by the distance which separates the leading edge of the plow 67' and the sled. FIG. 10 shows what the trenching apparatus of the present invention would look like with this distance lengthened. While it is not necessary that the divider 65 be extended from the leading edge to the rear of the sled, as is shown in FIG. 10, this feature allows the plow to rise over logs, etc. on the bottom.

The operation of the present invention is substantially as follows: The pipe 2 is fed from the lay barge 1 at the rear thereof through the rectangular support frame 12 and its associated guide rollers 17 and 18. The proper angle of descent is imparted to the pipe 2 by means of the Athey track 30 located at the rear of the lay barge. As shown in FIG. 1, the Athey track 30 and its supporting structures may be so arranged that the track actually extends beneath the surface of the water. As seen in FIGURE 11, however, the Athey track may be completely out of the water. The proper angle of descent is maintained by use of the float apparatus shown in FIGURE 1. The independent float means 4 with its associated holding means 6 holds the pipe in sliding engagement, thereby preventing it from dropping off sharply and also provides guiding means to the trenching apparatus. As the pipe is fed into the water, additional lengths of pipe 7' are attached to the pipe string 2, for example, by welding. Where the present invention is used to bury pipe that has been previously strung across the floor of the body of water, the feeding apparatus shown in FIGURE 1 is, of course, dispensed with and only the towing cable 10 extends from the sled 1. The towing cable 10 passes through the guide means on the rectangular frame 12 and is attached by means of the yoke 53 to the plow 50 and gives the plow its forward motion. Should the towing line 10 acquire some slack, this may be taken up by the reel or cable drum 11.

As the pipe 2 approaches the plow, it passes through the guide housing 95. The pipe then proceeds over the Athey track 56 between the rollers 59, over the support member 60 and finally between the guide rolls 71 and 72. At this point the pipe drops into the trench as is best shown by the broken lines in FIG. 5. The guide housing 95 properly positions the pipe on the plow 50 and the rollers and support means located on the plow maintain the pipe in its proper path of travel. By comparing FIGURES 1 and 5, one can see that the Athey track 56 may vary in height and position to correspond with the angle of descent of the pipe. The angle of descent will, of course, vary depending upon the depth of the water, among other things.

As the plow moves forward, the leading edges of the divider 65, the bottom portion 66, and the side walls 67, bite into the earth, thereby cutting the trench. The forward motion of the plow causes the spoil to be forced to the top of the plow up the sloping back walls 68. From this point the spoil is forced outwardly along the spreaders 69 as indicated by the arrows in FIGURE 4 and is deposited in two parallel rows on either side of the trench. Due to the decrease in width of the members 66 and 67 (as best seen in FIGURE 9) and to the upward inclination of the bottom member (as seen in FIGURE 5), only the leading portions of the trenching apparatus contacts the earth at the bottom of the body of water. This clearance or decrease in dimensions of the trenching mechanism from the front to the rear greatly lessens the drag and pressure that would otherwise be exerted by the side walls and bottom of the trench, thus making for greater ease of pulling and decreasing the possibility of cable breakage. It will also be noted in looking at FIGURE 8 that the width of the trenching mechanism increases substantially from the bottom to the top. This allows the dirt to move upwardly with as little resistive force being created as possible. As one can readily see, one of the primary objects set forth at the outset has been accomplished by this uniquely designed trenching apparatus, i.e., the reduction of drag on the two cables and the other trenching apparatus, thereby provide for greater ease and reliability of trenching.

As the plow moves forward cutting the trench, the pipe 2 is fed into the trench behind the plow as shown in FIG. 5. Following behind the plow 50 is the back filler 77, the wings 79 of which contact the parallel rows of spoil and convey it back into the trench through the opening 80 in the back filler. The leading members 78 of the back filler extend into the trench thus preventing the back filler from straying from its desired path.

Referring now to the perspective view of the plow shown in FIGURE 6, the apparatus used to guide the plow is disclosed. The string of pipe 2 extending from the lay barge, or which has been previously strung on the bottom of the body of water extends through the guide housing or collar 95 and between the rotating guide members 97 located within the housing. Depending upon whether the pipe is being laid simultaneously with the digging of the trench or whether it has been previously laid, the guide housing 95 may be in a raised (as shown in FIGURE 1) or a lowered (as shown in FIGURE 3) position. The support arms 92 and 92' may be positioned at any appropriate angle to correspond with the angle of pipe feed.

Should the pipe string 2 move to the right to left, the guide housing 95 will also move. This motion is transmitted through the plate 93, the support arms 92' and 92 to the rudders 91. The rudders will move in response to the movement of the guide housing 95 and will, accordingly, change the direction of the plow 50 to correspond with that from which the pipe string 2 is received.

One can accordingly see that additional desired objectives are accomplished by the present invention. The previously described and discussed guide means will react to and compensate for any change of direction of pipe feed, thereby insuring the proper alignment of the pipe 2 with the trench that is being dug. The plow will react to any sudden and unexpected shift in direction of feed, as well as any change of direction of the lay barge 1 which will be transmitted along the pipeline. By this means, the path of the trench may more accurately be controlled from the surface.

Turning now to the novel method by which forward motion is imparted to the trenching apparatus, as is illustrated in FIG. 13, one end 113' of a cable 113 is attached to a tug indicated at 114'. A substantial portion of the cable located intermediate of its ends is passed about the sleeve-drums 110 and 111 in the grooves 123. The other end 113" of the cable extends from the forward sleeve-drum 110 through its guide means 115" and is attached to a second tug 114". At the start of the pull, one of the tugs 114' is located a substantial distance from the barge 1 where it has set its anchor 130' in the bottom. The second tug 114" is relatively close to the barge. The motor 120 is then operated through the drive train 122 to rotate the drums 110 and 111 to cause the cable end 113' to be taken up, pulling the barge 1 toward the tug 114'. Slippage about the sleeve-drums 110 and 111 is prevented due to the frictional contact between the cable 113 and the sleeve-drums caused by the large number of times the cable is passed about the sleeve-drums. As the cable end 113' is taken up, the cable end 113" is let out a like amount from the sleeve-drums. While the barge is pulling itself toward the first tug 114', the second tug 114" is continuously moving away from the barge 1 so that when the barge reaches the first tug, the second tug is a substantial distance away from the barge. The second anchor 130" is now held stationary and the motor is reversed, thereby rotating the sleeve-drums in the opposite direction. This causes the cable end 113" to be taken in thus pulling the barge forward to the second tug 114". Simultaneously, the end 113' increases in length as the end 113" decreases in length, and the first tug 114' proceeds away from the barge as its cable end permits. Once the second barge 114" is reached, the motor 120 is once again reversed and the anchor 130' is held stationary. The barge is then drawn to the tug 114' as before. Thus, the tugs, in effect, leap-frog each other and in so doing the barge is pulled forward in an almost continuous process, stopping only for the furtherest barge to drop and set its anchor so that it may remain stationary while the barge 1 pulls itself to the tug.

By use of the above foregoing method and apparatus of moving the lay barge and associated trenching apparatus, the time necessary to perform the trenching operation is reduced a very substantial amount. During the actual pulling operation, speeds of up to one foot per second may be achieved. As discussed, the only stop time necessary in the pulling operation is for the furthermost tug to set its anchor. Prior to the present invention only one tug was used and required substantially greater time. The cable was let out its full length and the tug would move as far away from the barge as the cable would permit. It would then set its anchor and the barge would pull itself to the tug. The cable would then have to be unwound, and the tug moved forward and again set its anchor. Thus the down time in the prior art method was substantial, whereas the down time in the present method is quite small.

It should be pointed out that the present method may be used with only one tug. A stationary anchor instead of a tug may be used to pull the barge 1 to, the tug moving forward with the lengthening end of the cable. When the first anchor is reached, the tug sets the second anchor, and then proceeds back to take up the first, while the barge moves onto the second anchor. As can be seen, the down time here is considerably less than that of the prior art method. Where two tugs are used, the additional guide anchors shown in FIG. 2 are not usually necessary since the separate action of the tugs may be used to control the barge. In rougher water or weather, the guide anchors are required.

For purposes of the appended claims, the phrases relating to the "taking in" or "letting out" of one or the other ends of the cable used for towing purposes refers, of course, to the "taking in" or the "letting out" of that portion of the cable leading to the respective end, rather than the end itself. The phrases "taking in the end" and "letting out the end" and other like phrases have been used in the claims, however, for purposes of brevity and simplicity.

Although a particular embodiment has been described and discussed herein, it should be understood that it has been used merely for purposes of illustration. Variations and modifications can be effected and the invention herein is not limited to the particular embodiment disclosed. Other embodiments may be effected within the spirit and scope of the invention as described hereinabove and as defined in the appended claims.

What is claimed is:
1. A method of pulling a vessel across a body of water comprising the steps of:
   attaching said one end of a towline to an object located in the desired path of travel, which object can be held at least temporarily stationary,
   engaging an intermediate portion of the towline with a member attached to said vessel, said member being rotatable in both a clockwise and counterclockwise direction, the rotation of said member in one of said directions resulting in the taking in of said one end and the letting out of said opposite end, and rotation in the other of said directions resulting in the taking in of said opposite end and the letting out of said one end,
   attaching the opposite end of said towline to a tug which, relative to said object, is close to the vessel,
   holding said object stationary,
   taking in said one end by exerting a force thereon from the vessel, thereby pulling the vessel toward said point, and simultaneously,
   letting out the opposite end of the towline along the desired path,
   moving said tug forward along the desired path of travel as the opposite end of the towline is let out from the rotating member,
   halting the taking in of said one end when a predetermined distance has been reached, and
   repeating the above steps but reversing the one end and the opposite end whereby the holding, taking in and halting steps are performed on the opposite end and the letting out step is performed on the one end.
2. The method of claim 1 in further comprising the steps of:
   holding said opposite end stationary,
   rotating said member to pull in the opposite end, there- by pulling said vessel toward said opposite end while simultaneously moving said one end forward along the desired path with said tug, and repeating the above steps as desired.

3. The method of claim 1 wherein said object is a second tug, and said method is further defined as:

moving said second tug forward along the desired path of travel simultaneously with the taking-in of the opposite end of said towline, halting the taking-in of said opposite end when a predetermined distance has been reached, and repeating the above steps as desired.

4. The method of claim 3 wherein said vessel is attached to underwater trenching apparatus for movement of said apparatus along the bottom of said body of water as said vessel moves, and further including:

forming a trench as the trenching apparatus is pulled across the body of water, placing a pipe in the trench as it is formed, and guiding the trenching apparatus to move in the direction from which the pipe is received.

References Cited

UNITED STATES PATENTS

| | | | |
|---|---|---|---|
| 19,278 | 2/1858 | Brauer | 61—72.3 X |
| 942,510 | 12/1909 | Nikel | 115—7 |
| 2,144,063 | 1/1939 | Irvin | 61—72.4 |
| 2,589,411 | 3/1952 | Lorig | 242—47.09 X |
| 2,755,632 | 7/1956 | Hauber et al. | 61—72.4 |
| 2,952,236 | 9/1960 | Moyes | 115—7 X |
| 3,003,454 | 10/1961 | Shatoska et al. | 115—9 |
| 3,251,332 | 5/1966 | Vassar | 61—72.3 X |
| 3,063,402 | 11/1962 | Vallquist | 115—7 |
| 1,160,257 | 11/1915 | Burns | 115—7 |
| 1,569,910 | 1/1926 | Bohannon | 115—7 |
| 2,662,310 | 12/1953 | De Villota | 115—7 X |

FOREIGN PATENTS

| | | |
|---|---|---|
| 1,105,165 | 6/1955 | France. |

JACOB SHAPIRO, Primary Examiner

U.S. Cl. X.R.

115—7